(12) United States Patent
Fei et al.

(10) Patent No.: US 8,305,026 B2
(45) Date of Patent: Nov. 6, 2012

(54) 2 SPEED 2/4-POLE PSC/PSC MOTOR WITH INDEPENDENT MAIN WINDINGS AND SHARED AUXILIARY WINDING

(75) Inventors: Renyan W. Fei, St. Charles, MO (US); Larry L. Stevens, Fenton, MO (US); John G. Schrader, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 443 days.

(21) Appl. No.: 12/616,465

(22) Filed: Nov. 11, 2009

(65) Prior Publication Data

US 2011/0109258 A1    May 12, 2011

(51) Int. Cl.
 *H02P 25/00* (2006.01)
(52) U.S. Cl. ................................ 318/775; 318/773
(58) Field of Classification Search .............. 318/773, 318/775
 See application file for complete search history.

(56) References Cited

U.S. PATENT DOCUMENTS

| | | | |
|---|---|---|---|
| 5,146,147 A | 9/1992 | Wills et al. | |
| 5,825,111 A | 10/1998 | Fei | |
| 6,175,209 B1 | 1/2001 | Fei | |
| 6,707,214 B1 | 3/2004 | Fei | |
| 2004/0041490 A1 | 3/2004 | Fei | |
| 2004/0067050 A1* | 4/2004 | Woodward et al. | 388/804 |
| 2007/0126307 A1 | 6/2007 | Fei | |
| 2007/0229020 A1* | 10/2007 | Morgan et al. | 318/794 |
| 2009/0218981 A1* | 9/2009 | Heckenbach | 318/799 |

FOREIGN PATENT DOCUMENTS

| | | |
|---|---|---|
| CN | 620305 | 6/2004 |
| JP | 06054585 A | 2/1994 |

OTHER PUBLICATIONS

International Search Report for PCT/US2010/044341 dated Feb. 28, 2011, 3 pages.
Written Opinion for PCT/US2010/044341 dated Feb. 28, 2011, 4 pages.

* cited by examiner

*Primary Examiner* — Bentsu Ro
*Assistant Examiner* — Gabriel Agared
(74) *Attorney, Agent, or Firm* — Senniger Powers LLP

(57) ABSTRACT

A PSC/PSC motor for 2-pole operation and 4-pole operation. The motor uses an independent 2-pole main winding and an independent 4-pole main winding. An auxiliary winding includes an independent 2-pole auxiliary winding, an independent 4-pole auxiliary winding, and a shared auxiliary winding used in both the 2-pole operation and the 4-pole operation.

20 Claims, 3 Drawing Sheets

2 SPEED 2/4-POLE PSC/PSC MOTOR WITH INDEPENDENT MAIN WINDINGS AND SHARED AUXILIARY WINDING

FIELD OF THE INVENTION

The present invention generally relates to a two speed motor. In particular, the invention relates to a 2-speed permanent split capacitor (PSC) motor having independent main and auxiliary windings and both a shared auxiliary winding and a run capacitor.

BACKGROUND

For spa and swimming pool pumps, two different speeds are needed. When such pumps are driven by a 2/4-pole motor, a 2-pole speed is needed to run the full-load operation, i.e. create a water whirlpool, and a 4-pole speed is needed to run a light load, i.e., circulate the water. Because of the nature of the pump loads, the 4-pole output power is about ⅛ of the output power of the 2-pole operation. A PSC motor has been used for the 2-pole operation and a split phase or capacitive-start motor has been used for both 4-pole start and 2-pole start operations. The 4-pole operation uses the main winding only. Thus, the 4-pole efficiency is low. For example, a 2.5 Hp may have a 77% efficiency for 2-pole operation and a 48% for 4-pole operation.

In other similar products, a PSC motor has been used for 2-pole running and a capacitive-start motor has been used for both 4-pole start and 2-pole start. Again, the 4-pole run uses the main winding only.

In yet other similar products, a PSC/PSC motor solution has been used with independent main and auxiliary windings for the 2-pole PSC running. It also uses independent main and auxiliary windings for 4-pole PSC running. This solution has shortcomings and limitations. When the 2-pole winding is in operation, the 4-pole winding is idle. When the 4-pole winding is in use, the 2-pole winding is idle. Thus, the motor's windings are not efficiently used.

In U.S. Pat. No. 5,825,111, for "Single Phase Induction Motor 4/6 Pole Common Winding Connection with Magnetic Motive Force Symmetrically Distributed," co-invented and co-assigned with this application, a winding connection for a 4/6-pole PSC/PSC motor for a washer application is described. In this connection approach, a portion of the 4-pole main winding and a portion of 4-pole auxiliary winding become the 6-pole main winding and another portion of the 4-pole winding and another portion of the 4-pole auxiliary winding become the 6-pole auxiliary winding. It requires 11 leads and 7 single-pole double-through switches for switching between pole configurations.

U.S. Pat. No. 6,707,214, for "PSC Motor Having a 4/6 Pole Common Winding and Having an Additional 4-Pole Winding," co-invented and co-assigned with this application, is an improvement for U.S. Pat. No. 5,825,111. With an additional 4-pole winding, the performance for both speeds improves without increasing the lead and switch numbers.

In U.S. Pat. No. 6,175,209, for "2/4-pole PSC Motor with Shared Main Winding and Shared Auxiliary Winding," co-invented and co-assigned with this application, a winding connection for a 2/4-pole PSC/PSC motor for compressor application is described. In this connection approach, a 2-pole main winding becomes a 4-pole main winding and a 2-pole auxiliary winding becomes a 4-pole auxiliary winding through reconnection. The 2/4-pole main winding and the auxiliary winding are not 90 degree apart in space. The electrical angle between the 2-pole main and auxiliary windings is lower than 90 degree. The electrical angle between the 4-pole main winding and auxiliary winding is higher than 90 degree. The deviation from 90 degree for both represents a compromise in performance for both speeds. This approach requires 4 single-pole double throw switches for switching between pole configurations.

With the recent desire to increase energy conservation, there is a need to raise the 4-pole efficiency of water recreational pump motors. Also, many capacitive-start motors require a centrifugal actuator with the starting switches. A motor design which features a centrifugal starting switch is statistically less reliable than designs without it. Thus, there is also a need to develop such a motor which does not require a centrifugal starting switch and which does not require additional switches for switching between pole configurations.

SUMMARY

To solve the above efficiency problems as well as other problems, the invention comprises a PSC/PSC motor for 2-pole operation and 4-pole operation. The motor uses separate windings for 2-pole main and auxiliary windings and 4-pole main and auxiliary windings. The motor shares windings between the 2-pole auxiliary winding and 4-pole auxiliary winding.

The reconnection (and circulating current isolation) between the 2-pole and 4-pole operations is realized by a relay with one single-pole double throw switch. No additional switches internal to the motor are needed for switching between pole configurations, other than the relay; an external switch is used for selecting 2-pole operation or 4-pole operation. Because the 2-pole auxiliary winding uses thicker wire, the magnetic wire loss in the 4-pole auxiliary winding is reduced. As a result, the active material cost is reduced and the motor efficiency is improved.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

Figure 1:
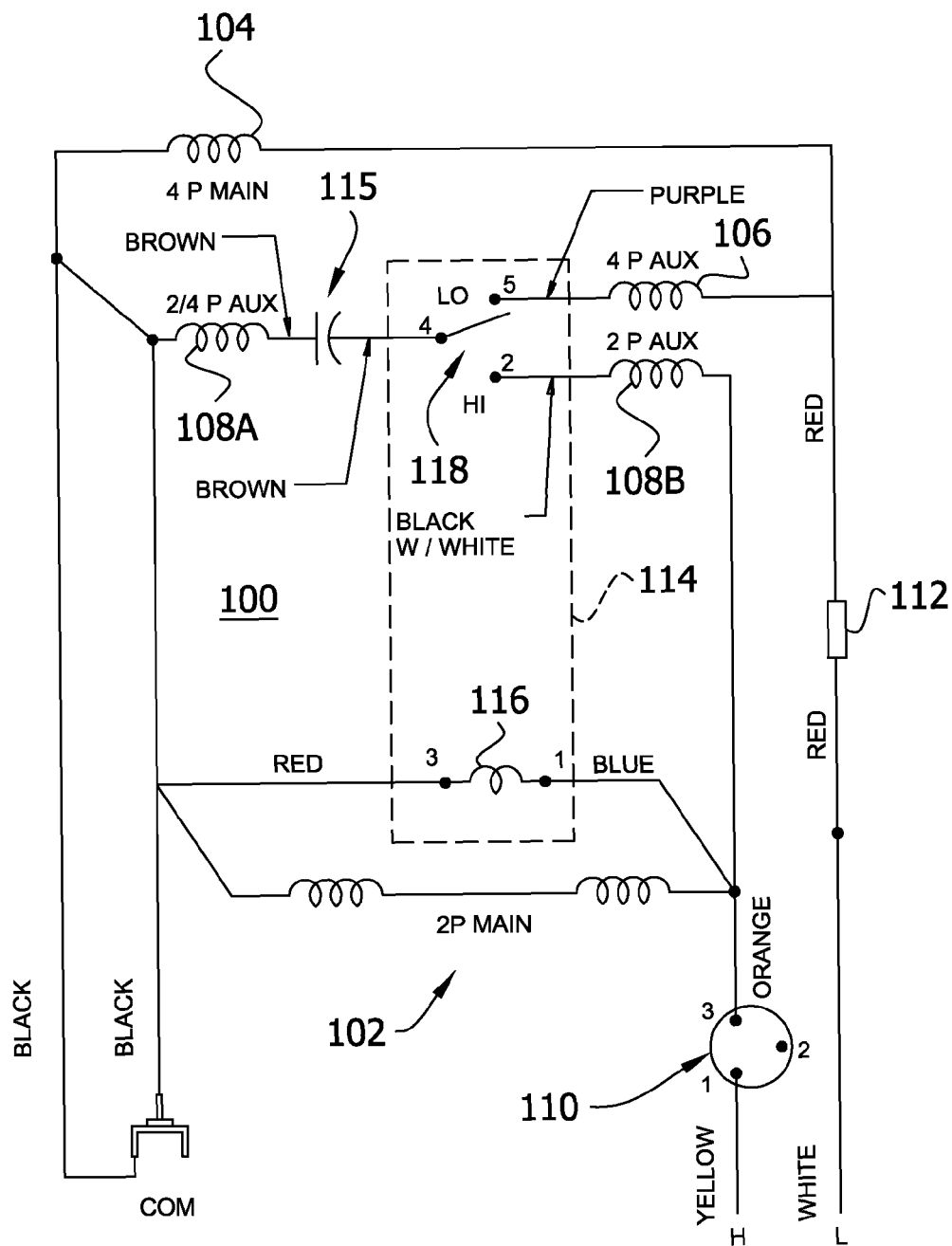
FIG. 1 is a schematic diagram of the electrical circuit of one embodiment of the motor according to the invention illustrating the independent main windings, the partially shared auxiliary windings and their interconnection.

FIG. 1 is a schematic diagram of the electrical circuit of one embodiment of the motor according to the invention illustrating the independent main windings, the partially shared auxiliary windings and their inter-connection. As shown in FIG. 1, the present invention is a motor 100 having a 2-pole main winding 102 and a 4-pole main winding 104 which are independent of each other. A 4-pole auxiliary winding 106 includes a common portion or shared winding 108A of a 2-pole auxiliary winding 108A, 108B. The 2-pole main winding 102 and the 2-pole auxiliary winding 108B may be in series with an optional 2-pole protector 110 to filter surges in voltage or current during 2-pole operation. Similarly, the 4-pole main winding 104 and the 4-pole auxiliary winding 106 may be in series with an optional 4-pole protector 112 to filter surges in voltage or current during 4-pole operation. A relay 114 controls the motor configuration and, in particular, whether the motor 100 is configured for operating in a 2-pole mode or a 4-pole mode.

Figure 2:
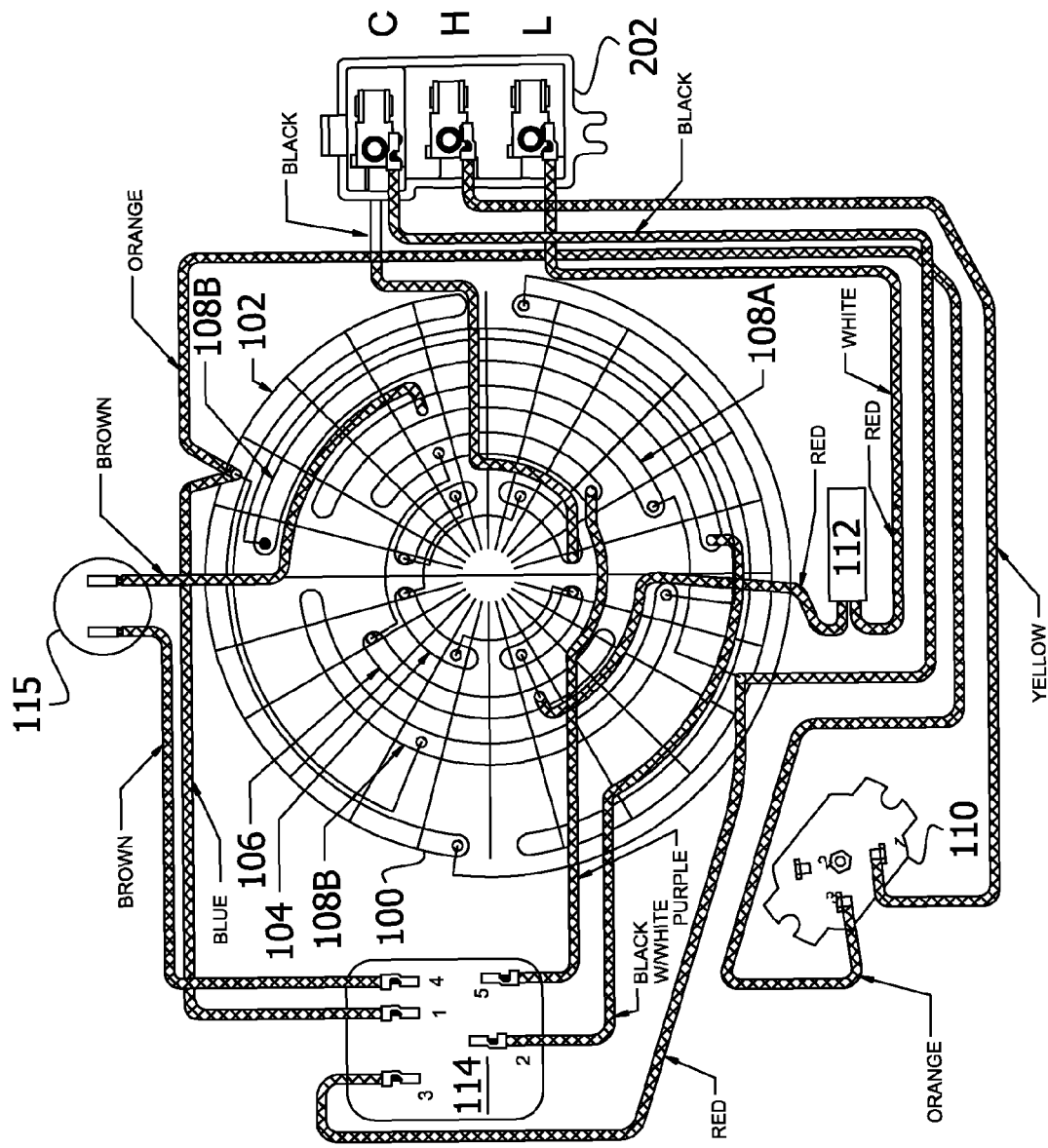
FIG. 2 is a diagrammatic view of the wire connections of one embodiment of the motor according to the invention.

The embodiment of FIGS. 1 and 2 illustrates a 2 speed 2/4-pole PSC/PSC with independent main windings and shared auxiliary windings, having configurations in which a capacitor 115 is in series with the 2-pole auxiliary winding 108A, 108B and in which the capacitor 115 is in series the 4-pole auxiliary winding 106, 108A. However, it is contemplated that other configurations may be employed as embodiments of the invention.

In operation, selected input ports of a connector (see reference character 202, FIG. 2) are powered by an external control circuit. Relay 114 is normally in a position in which contacts between terminals 4 and 5 of switch 118 are closed, as illustrated in FIG. 1.

For low speed operation, an input port L and a common input port COM of connector 202 are powered to energize the 4-pole main winding 104, the 4-pole auxiliary winding 106 and the shared winding 108A. A solenoid 116 of the relay 114 is not connected to the 4-pole main winding 104 and is not energized simultaneously with the 4-pole winding 104. Thus, relay switch 118 remains in its normal position to close a circuit between contacts 4 and 5, resulting in energizing the 4-pole auxiliary winding 106 and the shared winding 108A.

For high speed operation, an input port H and a common input port COM of connector 202 are powered to energize the 2-pole main winding 102, the 2-pole auxiliary winding 108B and the shared winding 108A. The solenoid 116 of the relay 114, connected in parallel with the 2-pole main winding 102, is energized simultaneously causing relay switch 118 to close a circuit between contacts 2 and 4, resulting in energizing the 2-pole auxiliary winding 108B and the shared portion 108A of the 2-pole auxiliary winding 108A, 108B. Thus, relay switch 118 is energized to close a circuit between contacts 4 and 2, resulting in energizing the 2-pole auxiliary winding 108A, 108B.

FIG. 2 is a diagrammatic view of the wire connections of one embodiment of the motor 100 according to the invention. FIG. 2 illustrates one embodiment of the positions of the windings and is color coded to match the color code illustrated in FIG. 1. As illustrated, the 2-pole main winding 102 may be positioned within the bottom of slots 308 of stator core 304 (see FIG. 3), and the 4-pole main winding 104 may be positioned at the top of the slots 308. The fact that the 4-pole main winding 104 is at the top of the slots 308 helps improve the 4-pole efficiency. The common portion 108A of the 2-pole auxiliary winding that is shared may be located in the middle of the slots 308.

According to one embodiment, both the 2-pole operating configuration of the motor 100 and the 4-pole operating configuration of the motor 100 need a certain minimum level of starting torque, e.g., around 10 oz-ft. Also, the 4-pole operating configuration needs about ⅛ of the output horsepower of the 2-pole operating configuration. As a result, the 4-pole main winding 104 can be wire of a smaller diameter and use less active magnetic material (e.g., copper or aluminum wire) than the wire used for the 4-pole auxiliary winding 106. In addition, using the common portion 108A of the 2-pole auxiliary winding as a shared portion of the 4-pole auxiliary winding saves more active material than sharing the 4-pole main winding from either 2-pole main winding or the 2-pole auxiliary winding. For example, the first auxiliary winding 108B and the shared auxiliary winding 108A comprise a copper wire having a larger diameter than the copper wire of the 4-pole main winding 104 and the second (4-pole) auxiliary winding 106.

Figure 3:
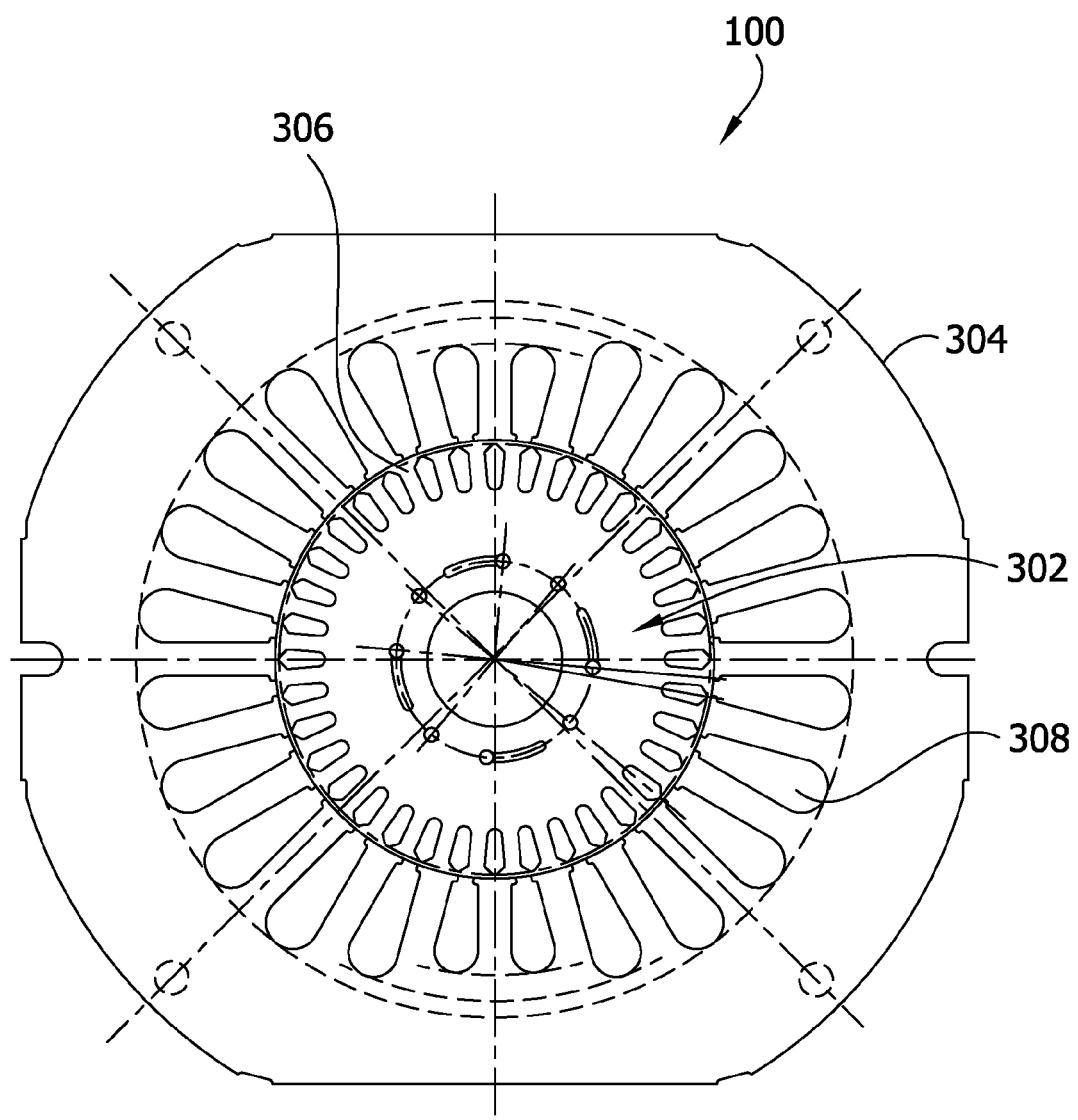
FIG. 3 is a cross sectional plan view taken along a plane perpendicular to the axis of rotation of one embodiment of the rotor and stator of the motor according to the invention.

FIG. 3 is a cross sectional plan view taken along a plane perpendicular to the axis of rotation of one embodiment of a rotor 302 and a stator core 304 of the motor 100 according to the invention. In this illustrated frame, the rotor 302 has 36 teeth 306 of substantially equal length and the stator core 304 has 24 slots 308, 20 slots of substantially equal depth and 4 slots having a same, shorter depth.

Thus, in one embodiment viewed as having a shared auxiliary winding, the invention comprises a motor 100 having a stator core 304 and a rotor 302 in rotational relationship with the stator core 304. A first main winding 102 has a 2-pole configuration and a second main winding 104 has a 4-pole configuration. In addition, auxiliary windings 106, 108 include a shared auxiliary winding 108A used in both the 2-pole configuration and the 4-pole configuration. An external switching circuit, including a connector 202 and related colored wires connecting the connector 202 to the windings 102, 104, 106, 108, selectively simultaneously energize the first main winding 102 and at least a common portion 108A of the auxiliary winding in the 2-pole configuration and selectively simultaneously energizes the second main winding 104 and at least a common portion 108A of the shared auxiliary winding in the 4-pole configuration.

In one embodiment viewed as having independent main windings with a partially shared auxiliary winding, the invention comprises a motor 100 having a stator core 304 and a rotor 302 in rotational relationship with the stator core 304. A first independent main winding 102 has only a 2-pole configuration (e.g., energized only in a 2-pole configuration) and a second independent main winding 104 has only a 4-pole configuration (e.g., energized only in a 4-pole configuration). A partially shared auxiliary winding 106, 108A, 108B has a first portion 108A, 108B which is energized in a 2-pole configuration and has a second portion 106, 108A, different than the first portion, which is energized in a 4-pole configuration. A switching circuit, including a connector 202 and related colored wires connecting the connector 202 to the windings 102, 104, 108, selectively simultaneously energizes the first independent main winding 102 and the first portion of the first auxiliary winding 108A, 108B in the 2-pole configuration and selectively simultaneously energizes the second independent main winding 104 and the second portion of the second auxiliary winding 106, 108A in the 4-pole configuration.

In one embodiment viewed as having independent main windings with shared and independent auxiliary windings, the invention comprises a motor 100 having a stator core 304 and a rotor 302 in rotational relationship with the stator core 304. A first independent main winding 102 has only a 2-pole configuration (e.g., energized only in a 2-pole configuration). A second independent main winding 104 has only a 4-pole configuration (e.g., energized only in a 4-pole configuration). A first independent auxiliary winding 108B has only in a 2-pole configuration (e.g., energized only in a 2-pole configuration). A second independent auxiliary winding 106 has only in a 4-pole configuration (e.g., energized only in a 4-pole configuration). A shared auxiliary winding 108A is energized in both a 2-pole configuration and a 4-pole configuration. A switching circuit, including a connector 202 and related colored wires connecting the connector 202 to the windings 102, 104, 108, selectively simultaneously energizes the first independent winding 102, the first auxiliary winding 108B and the shared winding 108A in the 2-pole configuration and selectively simultaneously energizing the second independent winding 104, the auxiliary winding 106 and the shared winding 108A in the 4-pole configuration.

In one embodiment, the relay configuration of the motor 100 is similar to a capacitive start 2/4-pole motors so that the same or similar components may be employed in both motors. For example, only a single capacitor 115 connected in series with the shared auxiliary winding 106, 108 is used and the relay 114 of the switching circuit includes only one single pole, double throw switch 118. As a result, the connections from an external control circuit to connector 202 correspond to the wiring connections to a capacitive start 2/4-pole motor.

Various embodiments of the invention achieve upwards to 80% efficiency for 2-pole operation and upwards to 60% efficiency for 4-pole operation. With design adjustments known to those skilled in the art and depending on frame size, teeth configuration, turns ratio, turns distribution, wire size, materials used, horsepower needed and other design parameters, embodiments of the invention may reach 81% efficiency for 2-pole operation and 62% for 4-pole operation. It is noted that, according to embodiments of the invention, the reconnection of the windings between the 2-pole and 4-pole operations is realized by a single relay 114 comprising one single-pole double-throw switch 118.

In addition to directing power to the proper 2-pole or 4-pole circuit configuration, the relay 114 isolates and open circuits the circulating-currents in the auxiliary windings by applying normally closed (NC) contacts to the energized windings while applying normally open (NO) contacts to the un-energized windings, so that only useful power is consumed and no un-useful power is being consumed. In particular, relay 114 open circuits the 4-pole auxiliary winding 106 when energizing the 2-pole auxiliary winding 108B and the shared auxiliary winding 108A in the 2-pole configuration. Similarly, relay 114 open circuits the 2-pole auxiliary winding 108B when energizing the 4-pole auxiliary winding 106 and the shared auxiliary winding 108A in the 4-pole configuration. Thus, the switching circuit including relay 114 isolates the portion of the auxiliary winding 108B when energizing the 4-pole auxiliary winding 106 and the shared portion of the auxiliary winding 108A, in the 4-pole configuration. Relay 114 also isolates the portion of the auxiliary winding 106 when energizing the 2-pole auxiliary winding 108B and the shared portion of the auxiliary winding 108A, in the 2-pole configuration.

In copper windings, because the 2-pole auxiliary winding 108B uses larger diameter wire than the diameter of the 4-pole auxiliary winding 106, the copper loss in the shared auxiliary winding 108A is reduced. In addition to the better performance efficiency, embodiments of the invention reduce the active material, e.g., the wire cost, in the 4-pole main winding 104. As a result, the 4-pole main winding 104 uses less copper than the 4-pole auxiliary winding 106. Sharing the auxiliary winding 108A in both the 2-pole and 4-pole configurations saves more active material than sharing the 4-pole main winding from either the 2-pole main winding or the 2-pole auxiliary winding.

As noted above, the 2-pole main winding 102 is in the bottom of the slots 308 and the 4-pole main winding 104 is at the top of the slots 308. The shared auxiliary winding 108A is in the middle of the slots 308. Locating the 4-pole main winding 104 at the top of the slots helps improve the 4-pole efficiency.

For both 2-pole and 4-pole configurations, the main windings 102, 104 and their auxiliary windings 108, 106, respectively, have 90 degree phase shift or a 90 degree electrical angle in space with each other. This approach allows the use of only 2 single-pole double-throw switches, one in the relay 114 and one in an external control circuit connected to the connector 202. In other words, the invention uses the same number of switches are 2/4 pole motors in the prior art. No additional internal switches to the motor or additional external control switches are needed for switching between pole configurations.

Having described the invention in detail, it will be apparent that modifications and variations are possible without departing from the scope of the invention defined in the appended claims.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

What is claimed is:

1. A motor comprising:
a stator core;
a rotor in rotational relationship with the stator core;
a first main winding having a 2-pole configuration;
a second main winding having a 4-pole configuration;
an auxiliary winding having a shared portion which is energized in both a 2-pole configuration and a 4-pole configuration, having a first portion which is energized in a 2-pole configuration, and having a second portion, different than the first portion, which is energized in a 4-pole configuration; and
a switching circuit for selectively simultaneously energizing the first main winding and at least a portion of the auxiliary winding in the 2-pole configuration and for selectively simultaneously energizing the second main winding and at least a portion of the auxiliary winding in the 4-pole configuration.

2. The motor of claim 1 said switching circuit for selectively simultaneously energizing the first main winding, the first portion of the auxiliary winding and the shared portion of the auxiliary winding in the 2-pole configuration and for selectively simultaneously energizing the second main winding, the second portion of the auxiliary winding and the shared portion of the auxiliary winding in the 4-pole configuration.

3. The motor of claim 2 further comprising a single capacitor connected in series with the shared portion of the auxiliary winding, wherein said switching circuit selectively simultaneously energizes the first main winding, the first portion of the auxiliary winding, the shared portion of the auxiliary winding, and the single capacitor in the 2-pole configuration and wherein said switching circuit selectively simultaneously energizes the second main winding, the second portion of the auxiliary winding, the shared portion of the auxiliary winding, and the single capacitor in the 4-pole configuration.

4. The motor of claim 2 wherein the first portion of the auxiliary winding and the shared portion of the auxiliary winding comprise a wire having a diameter larger than a diameter of wire of the second portion of the auxiliary winding.

5. The motor of claim 2 wherein the switching circuit includes only one single pole, double throw switch.

6. The motor of claim 1 wherein the switching circuit comprises a relay isolating at least a portion of the auxiliary winding while energizing at least a portion of the auxiliary winding in the 2-pole configuration; and wherein the relay isolates at least a portion of the auxiliary winding while energizing at least a portion of the auxiliary winding in the 4-pole configuration.

7. The motor of claim 6 wherein the auxiliary winding comprises a first auxiliary winding having only a 2-pole configuration, a second auxiliary winding having only a 4-pole configuration, and a shared auxiliary winding having both a 2-pole configuration and a 4-pole configuration, wherein said switching circuit selectively simultaneously energizes the first main winding, the first auxiliary winding and the shared auxiliary winding in the 2-pole configuration and selectively simultaneously energizes the second main winding, the second auxiliary winding and the shared auxiliary winding in the 4-pole configuration.

8. The motor of claim 7 further comprising a single capacitor connected in series with the shared auxiliary winding, wherein said switching circuit selectively simultaneously energizes the first main winding, the first auxiliary winding, the shared auxiliary winding, and the single capacitor in the 2-pole configuration and wherein said switching circuit selectively simultaneously energizes the second main winding, the second auxiliary winding, the shared auxiliary winding, and the single capacitor in the 4-pole configuration.

9. The motor of claim 6 wherein the portion of the auxiliary winding energized in the 2-pole configuration and a shared portion auxiliary winding energized in the 2-pole configuration and the 4-pole configuration comprise a wire having a diameter larger than a diameter of wire of the portion of the auxiliary winding energized in the 4-pole configuration.

10. The motor of claim 6 further comprising a capacitor in series with a shared portion of the auxiliary winding and wherein the switching circuit includes only one single pole, double throw switch.

11. A motor comprising:
a stator core;
a rotor in rotational relationship with the stator core;
a first main winding having a 2-pole configuration;
a second main winding having a 4-pole configuration;
an auxiliary winding;
a switching circuit for selectively simultaneously energizing the first main winding and at least a portion of the auxiliary winding in the 2-pole configuration and for selectively simultaneously energizing the second main winding and at least a portion of the auxiliary winding in the 4-pole configuration; and
a capacitor in series with the auxiliary winding wherein, in both the 2-pole configuration and the 4-pole configuration, the main windings and the auxiliary winding have a 90° phase shift or a 90° electrical angle in space with each other.

12. A motor comprising:
a stator core;
a rotor in rotational relationship with the stator core;
a first independent main winding having only a 2-pole configuration;
a second independent main winding having only a 4-pole configuration;
an auxiliary winding having a shared portion which is energized in both a 2-pole configuration and a 4-pole configuration, having a first portion which is energized in a 2-pole configuration, and having a second portion, different than the first portion, which is energized in a 4-pole configuration; and
a switching circuit for selectively simultaneously energizing the first independent winding and the first portion of the auxiliary winding in the 2-pole configuration and for selectively simultaneously energizing the second independent winding and the second portion of the auxiliary winding in the 4-pole configuration.

13. The motor of claim 12:
wherein the shared portion of the auxiliary winding is energized in both a 2-pole configuration and a 4-pole configuration; and
wherein the switching circuit selectively simultaneously energizes the first independent winding, the first portion of the auxiliary winding and the shared portion of the auxiliary winding in the 2-pole configuration and selectively simultaneously energizes the second independent winding, the second portion of the auxiliary winding and the shared portion of the auxiliary winding in the 4-pole configuration.

14. The motor of claim 13 wherein the first portion of the auxiliary winding energized in the 2-pole configuration and the shared portion of the auxiliary winding comprise a wire having a diameter larger than a diameter of wire of the second portion of the auxiliary winding energized in the 4-pole configuration.

15. The motor of claim 13 further comprising a capacitor connected in series with the shared portion of the auxiliary winding and wherein the switching circuit includes only one single pole, double throw switch.

16. The motor of claim 12 wherein the switching circuit comprises a relay that isolates the second portion of the auxiliary winding while energizing the first portion of the auxiliary winding in the 2-pole configuration; and isolates the first portion of the auxiliary winding while energizing the second portion of the auxiliary winding in the 4-pole configuration.

17. A motor comprising:
a stator core;
a rotor in rotational relationship with the stator core;
a first independent main winding having only a 2-pole configuration;
a second independent main winding having only a 4-pole configuration;
a first independent auxiliary winding having only a 2-pole configuration;
a second independent auxiliary winding having only a 4-pole configuration;
a shared auxiliary winding which is energized in both a 2-pole configuration and a 4-pole configuration; and
a switching circuit for selectively simultaneously energizing the first independent main winding, the first independent auxiliary winding and the shared auxiliary winding in the 2-pole configuration and for selectively simultaneously energizing the second independent main winding, the second independent auxiliary winding and the shared auxiliary winding in the 4-pole configuration.

18. The motor of claim 17 wherein the first independent auxiliary winding and the shared auxiliary winding comprise a wire having a diameter larger than a diameter of wire of the second independent auxiliary winding.

19. The motor of claim 17 further comprising a capacitor connected in series with the shared auxiliary winding and wherein the switching circuit includes only one single pole, double throw switch.

20. The motor of claim 17 wherein the switching circuit comprises a relay that isolates the second independent auxiliary winding while energizing the first independent auxiliary winding in the 2-pole configuration and isolates the first independent auxiliary winding while energizing the second independent auxiliary winding in the 4-pole configuration.

* * * * *